March 31, 1936.   R. W. GRACE   2,036,039
SAFETY CONNECTION AND TEST BLOCK
Filed June 5, 1933
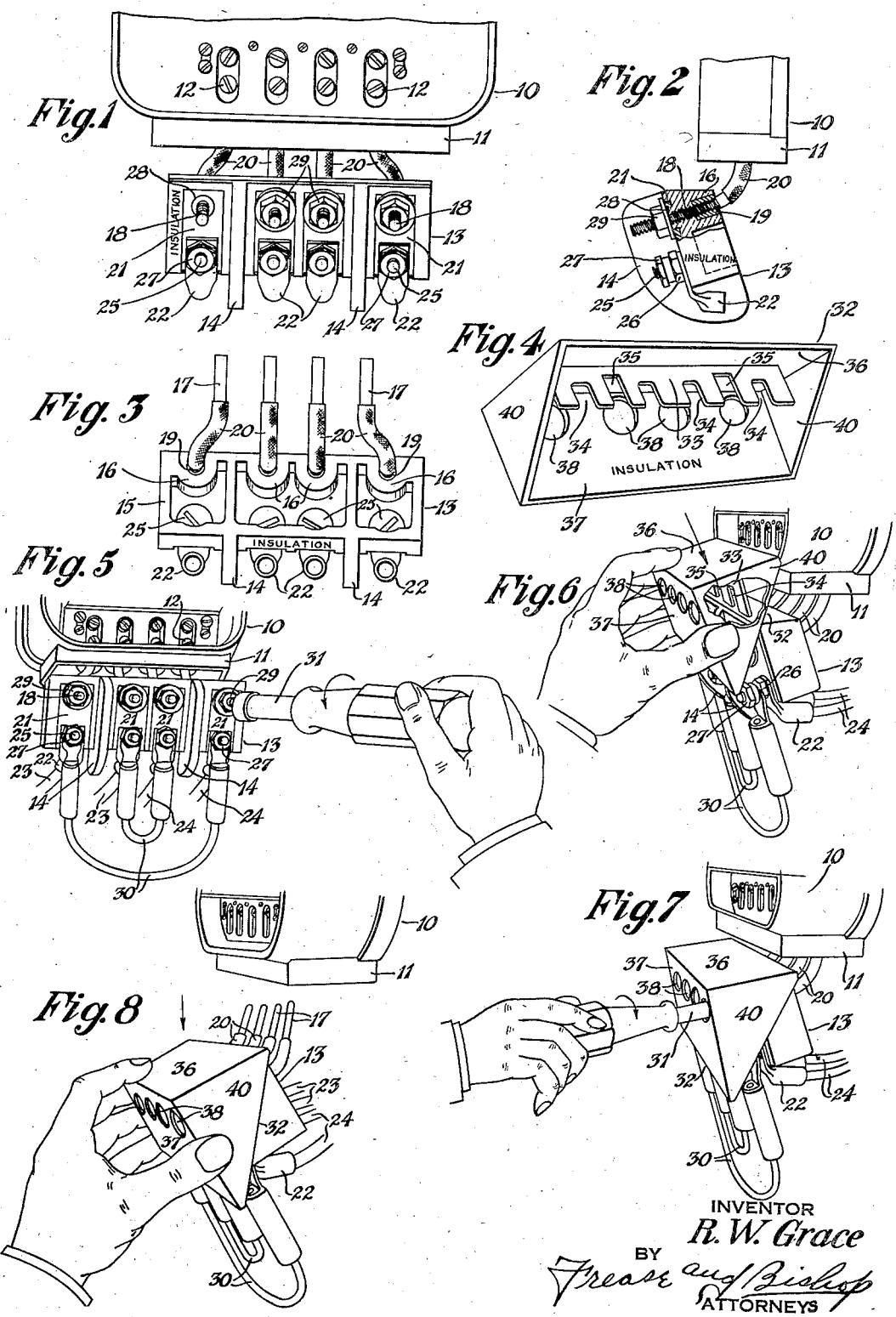
INVENTOR
R. W. Grace
BY
Frease and Bishop
ATTORNEYS Patented Mar. 31, 1936

2,036,039

UNITED STATES PATENT OFFICE 2,036,039

SAFETY CONNECTION AND TEST BLOCK

Richard W. Grace, Canton, Ohio, assignor to The Superior Switchboard & Devices Company, Canton, Ohio, a corporation of Ohio Application June 5, 1933, Serial No. 674,372

9 Claims. (Cl. 175—183)

The invention relates to test blocks for electric meters and more particularly to a combined test block and connection block with a cooperating reconnecting barrier especially adapted for use upon new sequence meters, and more particularly where such meters are mounted in overall meter enclosures having a limited space for disconnecting and testing facilities.

An object of the improvement is to provide a reliable, simple, rugged, economical and safe block which serves both as a disconnect and test block.

Another object is to provide a reconnecting barrier adapted to be mounted upon the block for disconnecting and reconnecting the same, the purpose of the barrier being not only to provide means for safely handling the block in order to disconnect or reconnect the same, but also to hold the meter wires "dead" when the barrier is in position, as well as to prevent disturbance of the alignment of these wires while the block is disconnected from the meter.

A still further object is to provide means for quickly and easily isolating the meter, for test purposes.

Another object of the improvement is to provide means for attaching the block to the meter only by the four meter terminal wires which are rigidly held in position whereby other attaching means is unnecessary.

A further object is to provide means for opening the circuit to the meter by merely loosening four flanged disconnect nuts upon the block.

The above, together with other objects which will be later explained, or which will be obvious from an inspection of the drawing and the following description, may be attained by constructing the improved block and barrier in the manner illustrated in the accompanying drawing, in which Figure 1 is a front elevation of the lower, or terminal chamber, portion of a meter, showing the improved disconnect and test block attached thereto;

Fig. 2, a side elevation of the same parts, showing them in the position shown in Fig. 1;

Fig. 3, a rear elevation of the improved block, showing the same disconnected from the meter;

Fig. 4, a perspective view of the improved reconnecting barrier, showing the interior thereof;

Fig. 5, a perspective view of the terminal portion of the meter with the block connected thereto, showing the jumpers connected to the block and the manner of loosening the flanged disconnect nuts to isolate the meter;

Fig. 6, a similar view, showing the manner of attaching the reconnect barrier, after the disconnect nuts have been loosened;

Fig. 7, a similar view showing the manner of again tightening the disconnect nuts to clamp the barrier in position upon the block; and Fig. 8, a perspective view showing the manner of disconnecting the block from the meter with the use of the safety disconnect barrier.

Similar numerals refer to similar parts throughout the drawing.

The lower portion of a meter is indicated at 10, the terminal chamber thereof being shown at 11, and the meter terminal set screws being shown at 12. The improved disconnect and test block, to which the invention pertains, includes an insulation block, molded or otherwise formed of bakelite or similar material and indicated generally by the numeral 13.

A transverse barrier wall 14 may be formed upon the front face of the insulation base 13 at a point spaced from each end thereof, said barrier walls extending down below the bottom of the base.

For the purpose of economy in material as well as to lighten the weight of the structure, the insulation base 13, instead of being formed in a solid block, may be provided with a reinforcing flange or wall 15 at its edge portions, upon the rear side of the base, and with the bosses 16 through which the meter terminal wires 17 are located.

These terminal wires are preferably formed of solid dead soft insulated copper wires located through suitable openings in the insulation base 13 and threaded upon one end portion as at 18, being screwed through the threaded bushings 19 molded in the rear side of the insulation base.

The rear end portions of these terminal wires are bent upward at an angle so as to be inserted into the terminal chamber 11 of the meter and to be held in place therein as by the usual set screws 12. The intermediate portion of each of these terminal wires may be insulated as indicated at 20 for safety.

Flat thin conductor bars 21 are mounted upon the insulation base, two of said bars being located between the barrier walls 14 and one bar upon each side of each barrier wall, as illustrated. The wire lugs 22 may be soldered to the line and load wires 23 and 24, respectively, in usual manner, the flattened ends of these lugs being then placed over the screws 25 which are located through the lower portion of the insulation base and through suitable openings in the conductor bars 21.

The flat nuts 26 are then screwed upon the screws 25 to hold the lugs tightly clamped upon the conductor bars after which the thick nuts 27 may be placed upon the screws 25.

Each of the conductor bars 21 is provided at its upper end with an aperture 28, considerably larger than the threaded end portions 18 of the terminal wires so that each jumper bar is spaced from the adjacent terminal wire.

The flanged disconnect nuts 29 are then screwed upon the threaded ends 18 of the meter terminal wires, clamping said terminal wires in the desired adjusted position and electrically connecting the same to the conductor bars 21.

When it is desired to test the meter, the four thick nuts 27 of the bottom row are backed off sufficiently to permit the jumpers 30 to be inserted between the same and the thin nuts 26, after which the nuts 27 are again tightened, holding the jumpers clamped in position. Then with a tool such as the socket wrench 31, the flanged disconnect nuts 29 are backed off, as shown in Fig. 5, breaking the connection between the meter terminal wires 17 and the conductor bars 21.

The meter is thus isolated without interrupting the current to the user, which is carried from the load wires through the jumpers 30 to the line wires.

If it is desired to disconnect the meter from the block, the reconnecting barrier shown in Fig. 4 is used. This barrier is formed of insulation material such as bakelite or the like, and comprises a housing indicated generally at 32, preferably of V-shaped cross section and provided upon its interior with the insulation barrier wall 33 having the notches 34 and 35 therein to receive the threaded end portions 18 of the meter terminal wires, and the barrier walls 14 of the block, respectively.

The top wall 36 of the V-shaped barrier housing, from which the barrier wall 33 depends, is preferably solid or unbroken as illustrated, while the front wall 37 thereof is provided with the horizontal row of substantially circular apertures 38 of sufficient size to receive the socket wrench 31. The ends of the V-shaped housing are closed by the substantially triangular end walls 40.

In order to disconnect the block from the meter, the reconnecting barrier is grasped in one hand and slid downward as shown in Fig. 6, the depending barrier wall 33 being received between the conductor bars 21 and the flanged disconnect nuts 29, the slots 34 and 35 receiving the meter terminal wires 18 and barrier walls or flanges 14, respectively.

The socket wrench is then inserted through the apertures 38, as shown in Fig. 7, engaging the flanged disconnect nuts 29 to tighten the same so as to clamp the insulation barrier wall 33, of the reconnecting barrier, tightly between the nuts 29 and the conductor bars 21, holding the meter terminal wires clamped in position and maintaining the meter isolated from the line and load wires.

The terminal set screws 12 may then be loosened by a screw driver, after which the insulation reconnecting barrier may be safely grasped in one hand as shown in Fig. 8 and by pulling downward upon the same, the block is easily disconnected from the meter. The safety reconnecting barrier prevents the operator from accidentally coming into contact with any exposed live conductor.

The current to the consumer is not disturbed and the meter terminal wires 17 are held in proper position while the block is disconnected from the meter.

The meter may be repaired or replaced, after which the block may be easily reconnected thereto and the reconnecting barrier removed by reversing the operations above described in detail.

I claim:

1. A connection and test block including an insulation base, meter terminal wires threaded through said base, conductor bars carried by the base and spaced from the terminal wires, and nuts upon the threaded ends of said terminal wires for clamping the wires in adjusted position and for electrically connecting said wires to said conductor bars.

2. A connection and test block including an insulation base, meter terminal wires threaded through said base, conductor bars carried by the base and having openings of larger diameter than the terminal wires to receive said wires, and nuts upon the threaded ends of said terminal wires for clamping the wires in adjusted position and for electrically connecting said wires to said conductor bars.

3. A connection and test block including an insulation base, meter terminal wires adjustably mounted through the base, conductor bars upon the base and having openings of larger diameter than the terminal wires to receive said wires, nuts upon the terminal wires normally electrically connecting said wires to said conductor bars, and a reconnecting barrier including an insulation barrier wall clamped between said nuts and said conductor bars.

4. A connector and test block including an insulation base, meter terminal wires adjustably mounted through the base, conductor bars upon the base and spaced from the terminal wires, nuts upon the terminal wires normally electrically connecting said wires to said conductor bars, and a reconnecting barrier including an insulation barrier wall clamped between said nuts and said conductor bars.

5. A connection and test block including an insulation base, meter terminal wires adjustably mounted through the base, conductor bars upon the base and having openings of larger diameter than the terminal wires to receive said wires, nuts upon the terminal wires normally electrically connecting said wires to said conductor bars, and a reconnecting barrier including a housing provided with an insulation barrier wall clamped between said nuts and said conductor bars.

6. A connector and test block including an insulation base, meter terminal wires adjustably mounted through the base, conductor bars upon the base and spaced from the terminal wires, nuts upon the terminal wires normally electrically connecting said wires to said conductor bars, and a reconnecting barrier including a housing provided with an insulation barrier wall clamped between said nuts and said conductor bars.

7. A connection and test block including an insulation base, meter terminal wires adjustably mounted through the base, conductor bars upon the base and having openings of larger diameter than the terminal wires to receive said wires, nuts upon the terminal wires normally electrically connecting said wires to said conductor bars, and a reconnecting barrier including an insulation housing provided with a slotted barrier wall clamped between said nuts and said conductor bars.

8. A connector and test block including an insulation base, meter terminal wires adjustably mounted through the base, conductor bars upon the base and spaced from the terminal wires, nuts upon the terminal wires normally electrically connecting said wires to said conductor bars, and a reconnecting barrier including an insulation housing provided with a slotted barrier wall clamped between said nuts and said conductor bars.

9. A connection and test block including an insulation base, rigid meter terminal wires having angular portions adapted to be inserted into the terminal chamber of a meter and having straight portions axially and longitudinally, adjustably mounted through bores in said base, line and load wires normally connected to said meter terminal wires, means for electrically disconnecting said line and load wires from said terminal wires, and for clamping said terminal wires in adjusted position when disconnected from the line and load wires.

RICHARD W. GRACE.